Figure 1:
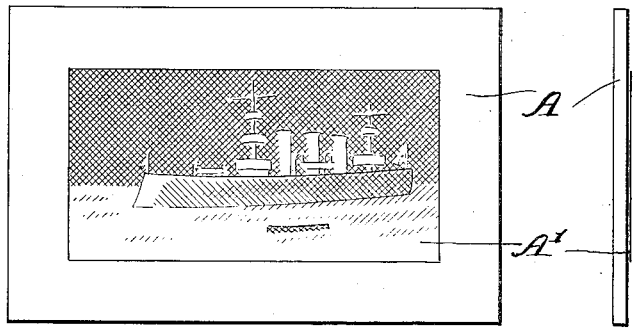

No. 640,469. Patented Jan. 2, 1900.
J. JACOBSON.
PROCESS OF MAKING HALF TONES.
(Application filed Feb. 4, 1899.)

(Specimens.)

WITNESSES:
D. H. Hayward
Geo. E. Cruse.

INVENTOR
John Jacobson
BY
E N Dickens
HIS ATTORNEY

UNITED STATES PATENT OFFICE.

JOHN JACOBSON, OF BOSTON, MASSACHUSETTS, ASSIGNOR TO THE JACOBSON COMPANY, OF WEST VIRGINIA.

PROCESS OF MAKING HALF-TONES.

SPECIFICATION forming part of Letters Patent No. 640,469, dated January 2, 1900.

Application filed February 4, 1899. Serial No. 704,453. (Specimens.)

*To all whom it may concern:*

Be it known that I, JOHN JACOBSON, a citizen of the United States, residing at Boston, in the county of Suffolk and State of Massachusetts, have invented a new and useful Process for Making Half-Tones, of which the following is a specification.

The process generally employed for making a half-tone plate is first to expose a negative to the picture or other object to be copied through an interposed-line screen, and the negative so taken is then developed. A prepared metal plate is then exposed to light, which passes through the negative, and the exposed metal plate is etched in the usual manner to make the positive. After the plate is made it is worked up or engraved by hand in order to clear the lights and obtain a brilliant printing-plate.

The primary object of my invention is to make a negative from which a plate can be made that will print substantially a perfect reproduction of all the high lights and shadows of a picture or other object to be reproduced, and thus do away with the necessity of working up or hand-tooling said metal plate. I accomplish this by means of two negatives. Each negative is taken separately and developed in the usual manner. The negatives are then superimposed, matched, or registered and printed through to make the positive plate.

The process of making the two negatives is as follows: One of the negatives is correctly exposed as to lights and shadows in the usual manner, as above described. The second negative is an underexposed one in order that substantially the high lights alone may be taken. This negative is preferably exposed through a screen of a different texture or a screen having single lines extending in a direction different from the lines of the screen through which the first negative was exposed. Preferably the lines on the screen through which the second negative is exposed should extend in a vertical or horizontal direction. After both negatives have been exposed and developed they are superimposed, matched, or registered and held from any relative movement by any desired means or in any desired manner and then applied to the prepared metal plate in their superimposed condition for exposure to make a positive plate. The metal plate after exposure is then developed and etched in the usual manner in order that it may be printed from.

Preferably one of the negatives should be taken on a "stripping-film" in order that it may be brought into intimate contact with the second negative. Preferably the negative taken on the stripping-film is exposed through a reversing-prism, so that when the two negatives are superimposed there will be no reversal as to right and left. This also permits of the negatives being placed face to face, so that when the positive plate is exposed to light through the superimposed negatives there will be no opportunity for diffusion of light, which causes blurring.

In the accompanying drawings I have illustrated two negatives made in accordance with my process.

Figure 2:
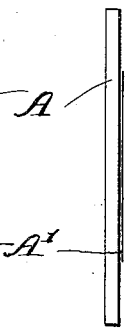
Figure 3:
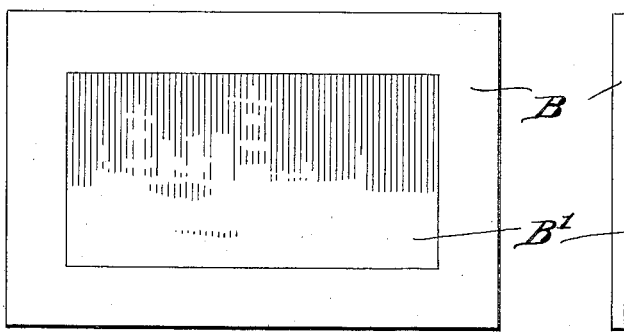
Figure 4:
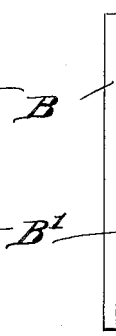
Figure 5:
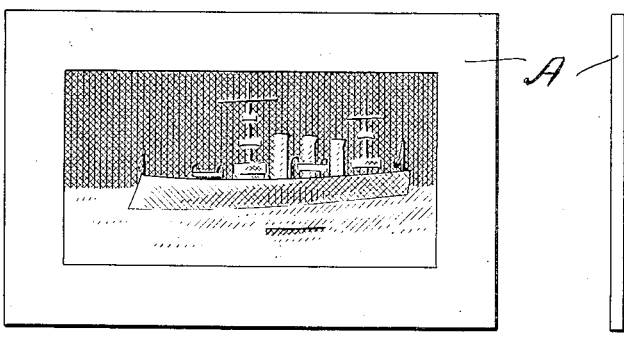
Figure 6:

Figure 1 represents a negative exposed through a cross-line screen. Fig. 2 is an edge view thereof. Fig. 3 represents a negative exposed through a single-line screen. Fig. 4 is an edge view thereof. Fig. 5 represents the negative shown in Figs. 1 and 3 superimposed. Fig. 6 is an edge view of Fig. 5. Figs. 2, 4, and 6 are exaggerated for the purpose of showing the films on the glass plates.

Similar letters of reference designate corresponding parts in all the figures.

A represents a negative the film A' of which has been properly exposed through a cross-line screen. B represents a negative the film B' of which has been underexposed through a single-line screen. This film, as indicated in Fig. 4, is a stripping-film and is preferably exposed through a reversing-prism. The film B' after it is stripped from its plate is placed over the film A' and matched with it. It is then fastened in any desired manner to prevent its becoming displaced.

What I claim as my invention is—

1. A negative for half-tone processes, composed of two negatives of the same object superimposed and matched or registered.

2. A negative for half-tone processes, composed of two negatives of the same object exposed through screens of different textures and then superimposed and matched or registered.

3. A negative for half-tone processes composed of two negatives of the same object superimposed matched or registered, one of which is underexposed.

4. A negative for half-tone processes, composed of two superimposed and matched or registered negatives of the same object exposed through screens of different textures, one of which is underexposed.

5. The process of making a half-tone plate which consists, first, in exposing a plate to the picture or object to be copied through a line-screen, then exposing a second plate to the same picture or object through a line-screen, then developing the exposed plates to make negatives, superimposing the two negatives and matching or registering them, and finally exposing a prepared plate on which the positive is to be made to light through the superimposed negatives.

6. The process of making a half-tone plate which consists, first, in exposing a plate to the picture or object to be copied through a line-screen of one texture, then exposing a second plate to the same picture or object through a line-screen of a different texture, then developing the exposed plates to make negatives, superimposing the two negatives and matching or registering them, and finally exposing a prepared plate on which the positive is to be made, to light through the superimposed negatives.

In testimony whereof I have signed my name to this specification in the presence of two subscribing witnesses.

JOHN JACOBSON.

Witnesses:
  H. COUTANT,
  GEO. E. CRUSE.